(12) United States Patent
Witten et al.

(10) Patent No.: US 8,871,823 B2
(45) Date of Patent: Oct. 28, 2014

(54) PROCESS FOR INTRODUCING A GAS INTO A POLYMER

(75) Inventors: Neil Witten, Croyden (GB); Paul Jacobs, Croyden (GB)

(73) Assignee: Zotefoams, PLC, Croyden (GB)

( * ) Notice: Subject to any disclaimer, the term of this patent is extended or adjusted under 35 U.S.C. 154(b) by 267 days.

(21) Appl. No.: 11/909,563

(22) PCT Filed: Mar. 24, 2006

(86) PCT No.: PCT/GB2006/001116
§ 371 (c)(1),
(2), (4) Date: Apr. 11, 2008

(87) PCT Pub. No.: WO2006/100517
PCT Pub. Date: Sep. 28, 2006

(65) Prior Publication Data
US 2009/0048356 A1    Feb. 19, 2009

(30) Foreign Application Priority Data
Mar. 24, 2005  (GB) .................................. 0506146.0

(51) Int. Cl.
C08J 9/00 (2006.01)
C08J 9/16 (2006.01)
C08J 9/30 (2006.01)
B29C 44/00 (2006.01)
B29C 44/34 (2006.01)
C08J 9/12 (2006.01)

(52) U.S. Cl.
CPC ......... B29C 44/3453 (2013.01); B29C 44/3446 (2013.01); C08J 2201/032 (2013.01); C08J 9/12 (2013.01)
USPC .................................. 521/54; 521/79; 264/50

(58) Field of Classification Search
USPC ........................... 521/54, 64, 79, 164; 264/50
See application file for complete search history.

(56) References Cited

U.S. PATENT DOCUMENTS

| 4,473,665 A | * | 9/1984 | Martini-Vvedensky et al. ............................... 521/79 |
| 6,127,440 A | * | 10/2000 | Sanyasi ........................... 521/74 |
| 2001/0031794 A1 | * | 10/2001 | Yamamoto et al. ............. 521/50 |
| 2004/0167241 A1 | * | 8/2004 | Scherzer et al. ................ 521/79 |

FOREIGN PATENT DOCUMENTS

| EP | 0 765 724 A | 4/1997 | |
| EP | 1 273 420 A | 1/2003 | |
| EP | 1 407 868 A | 4/2004 | |
| JP | 58-215327 | * 12/1983 | ............. B29D 27/00 |
| JP | 04-108834 | * 4/1992 | ................. C08J 9/22 |

OTHER PUBLICATIONS

"Polystyrene." Wikipedia.org. 2013.*
Definition of "Regrind." About.com 2013.*
Technical Data Sheet. Udel P-1700. Solvay. 2013.*
"Effects of Molecular Weight of Polysulfone on Phase Separation Behavior for Cyanate Ester/Polysulfone Blends," to Hwang et al., from Journal of Applied Polymer Science, vol. 77, pp. 921-927 (2002) John Wiley & Sons.*
Patent Abstracts of Japan (1992), vol. 016, No. 356 (C-0969), Jul. 31, 1992—JP 04 108834 A (Hitachi Chem. Co. Ltd.) Apr. 9, 1992—Abstract.
Database WPI, Derwent Publications Ltd., London, (1993), Section Ch, Week 199344, AN 1993-348568, XP002385464—JP 05 255531 A (Sekisui Plastics Co. Ltd.) Oct. 5, 1993—Abstract.
Database WPI, Derwent Publications Ltd., London, (1983), Section Ch, Week 198405, AN 1984-026007, XP002385658—JP 58 215327 A (Nippon Styrene Paper KK) Dec. 14, 1983—Abstract.

* cited by examiner

*Primary Examiner* — Kara Boyle
(74) *Attorney, Agent, or Firm* — Daniel A. Blasiole; Joseph T. Leone, Esq.; DeWitt Ross & Stevens S.C.

(57) ABSTRACT

A first polymer (preferably in granular form) is exposed to a gas at a pressure higher than atmospheric pressure to introduce the gas into the polymer. This occurs at a temperature from the glass transition temperature to the melting temperature when the first polymer is crystalline or semi-crystalline in nature, or at a temperature below the glass transition temperature when the first polymer is amorphous in nature. Optionally, the gas-laden polymer may then be mixed with a second polymer. The polymer is then melted to produce a foamed article.

12 Claims, 2 Drawing Sheets

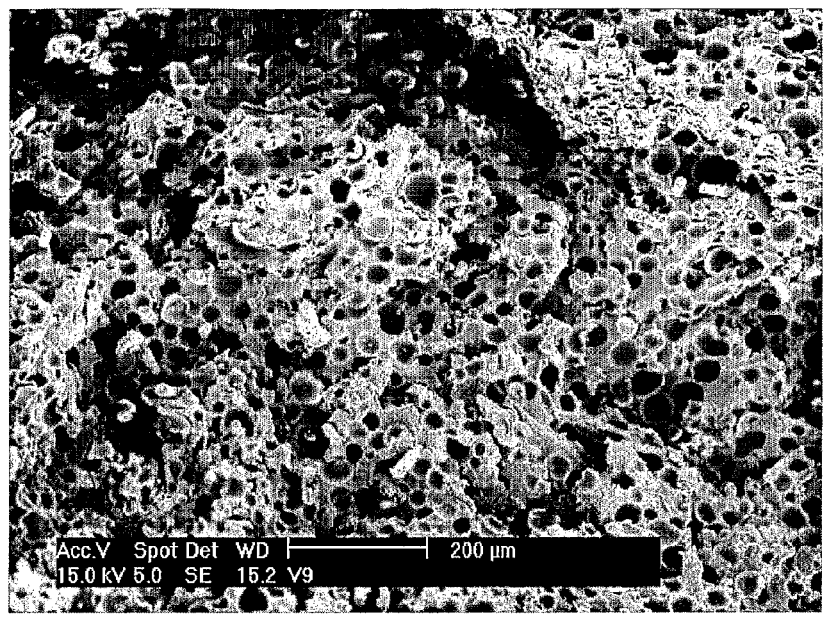
Fig. 1 : SEM of fracture surface for PEEK150GL30 moulding showing cellular structure.

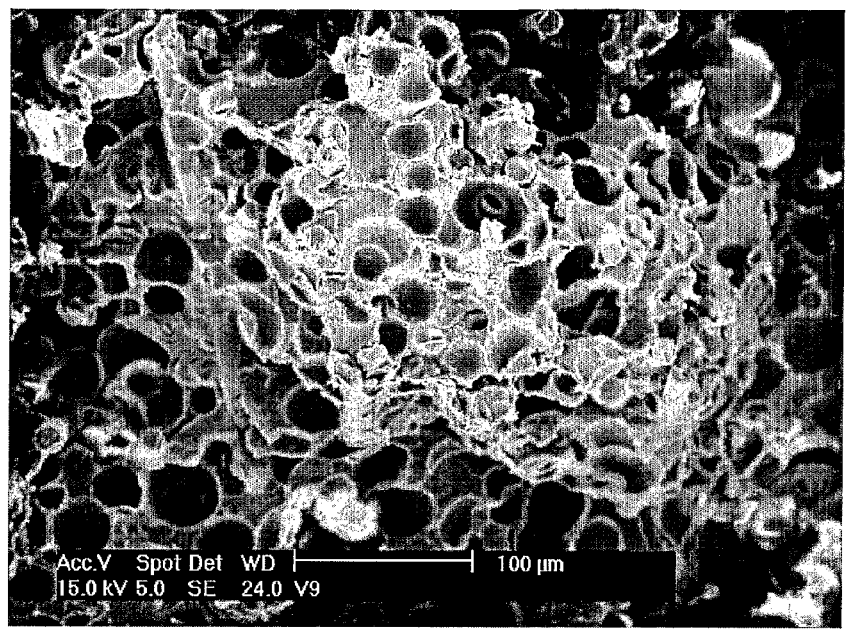
Fig. 2 : SEM of fracture surface for PEEK150GL30 moulding showing cellular structure.

PROCESS FOR INTRODUCING A GAS INTO A POLYMER

The present invention relates to a process for introducing a gas into a polymer, and in particular a process for the preparation of polymer materials loaded with an inert gas, as a precursor for intentional conversion by known techniques such as injection moulding, transfer moulding, profile extrusion, blow moulding and the like into a shaped foamed article.

Polymer materials are very widely used in industry and are typically converted from a powder or granular form into a shaped article by the application of heat and pressure. The shaping of the article is produced via a very wide variety of processes dependent on the final article and functional requirements (hollow shape, continuous profile, detail of design, etc.). A vast array of thermoplastic and thermosetting polymer materials exists of greatly varying capability in temperature, mechanical strength, chemical resistance, etc. The properties of the base polymer material may then be further enhanced or modified by the addition of reinforcing agents such as carbon or glass fibres and by the incorporation of fillers, and other functional additives, such as colourants, nano-composites, flame retardants, etc.

There is a need to reduce the density of mouldings of many of these types of plastics articles to allow extended use in either weight sensitive applications (such as in mass transport) or for the additional functional properties that are therefore produced (such as buoyancy for high temperature chemical floats and the like) or for high temperature insulation materials (utilising the reduced thermal conductivity of the reduced density article and the high temperature resistance of the base polymer or compound).

U.S. Pat. No. 4,473,665 (Martini-Vvedensky et al) discloses a technique for the manufacture of microcellular closed cell foams involving the saturation of polymer pellets at temperatures below the glass transition temperature (Tg) followed by rigorous controls on pressure and temperature in post processing equipment to ensure that parts with void (cell) sizes of the order of 2 to 25 microns are produced. The hardware required to ensure control is described in detail in the patent.

U.S. Pat. No. 5,158,986 (Cha et al) discloses two techniques for the production of supermicrocellular foams with void (cell) sizes of the order of 0.1 to 2 microns. Both processes utilise supercritical (SCF) carbon dioxide as the blowing agent. In one process the polymer is extruded into a sheet which is then saturated with the supercritical carbon dioxide. In the other the polymer is melted in a conventional extruder and the supercritical carbon dioxide is fed into the barrel of the machine.

U.S. Pat. No. 4,473,665 and U.S. Pat. No. 5,158,986 both describe techniques for the production of microcellular and supermicrocellular foams. However, in practice, it is extremely difficult to continuously perform the production of foamed articles by the techniques described in either of these patents.

U.S. Pat. No. 5,997,781 seeks to address the shortcomings of these patents by disclosing a process for the production of relatively thick articles with very small average cell diameter from 0.01 to 50 microns. In this process the blowing agent gas is introduced into the molten resin while it is in the extruder barrel. The gas laden melt is injected into the mould while a gas counterpressure is applied in order to allow the nucleation and cell growth of the material to be controlled.

U.S. Pat. No. 6,169,122 describes a process whereby nucleating agents are included in the composition in order to control cell nucleation. In the process described the polymer granules are fed to an extruder and the blowing agent gas is injected into the melt stream through a plurality of ports on the extruder barrel. The gas is then mixed with the polymer to form a single phase polymer-gas mixture. Nucleation and cell growth then occurs on exit of the die of the extruder. Both microcellular and non-microcellular materials are described by this process.

In all cases additional hardware and strict controls are necessary (relative to standard polymer processing operations) to ensure that nucleation is controlled and to ensure that microcellular structures are produced.

DE19853021 describes a process in which the blowing agent is introduced into the melt stream of a conventional injection moulding machine. In this process the blowing agent is not introduced in the extruder barrel but through sintered metal surfaces of a specially designed melt flow channel placed after the extruder barrel.

U.S. Pat. No. 5,091,126 describes a solvent process for application with polyarylethersulfones or polyetherimide thermoplastics and describes the process of dissolution of the blowing agent, in this case a volatile organic solvent such as methyl ethyl ketone or dichloromethane (depending on the material being foamed). The process of foaming is described for a range of materials and the requirement for post-foam drying to remove residual solvent is also explained.

Further polymer processing methods are disclosed in the following published documents: JP 2003261707 (Fujikura Ltd); JP2003127165 (Sekisui Plastics); JP 20033103556 (Polyplastics Co.); JP 5271459 (Sekisui Plastics Co. Ltd); JP 11170288 (Yamaha Corp); JP 11080408 (Nippon Styrene Paper KK); GB 1445474 A (Kanegafuchi Chemical Ind.) and JP 60110431 (Nippon Styrene Paper KK).

For example, JP 2003261707 discloses a process for forming granules of a thermoplastic resin such as polyethylene by exposing the granules to an inert blowing agent such as carbon dioxide in the supercritical state and then moulding and foaming the granules.

JP 11080408 discloses impregnating a resin with an inert gas in a pressurised container, withdrawing the impregnated resin from the container and then heating it to a temperature between the glass transition temperature and the melting temperature.

There is a need therefore for a simplified approach to foam production for injection moulding and other polymer processing methods such as transfer moulding, extrusion, compression moulding or rotational moulding. The present invention allows the complete range of polymer materials to be envisioned for application and also requires little or no additional handling or processing hardware.

In accordance with a first aspect of the invention, there is provided a process for introducing a gas into a polymer, comprising the step of:
(i) exposing a first polymer to a gas at a pressure higher than atmospheric pressure to introduce the gas into the polymer, wherein step (i) is carried out at a temperature from the glass transition temperature to the melting temperature when the first polymer is crystalline or semi-crystalline in nature, or at a temperature below the glass transition temperature when the first polymer is amorphous in nature.

It should be noted that this is not the same process as prior art such as JP 11080408, in which it is the post-processing expansion step which is carried out at a temperature from the glass transition temperature to the melting temperature of the impregnated resin.

The first polymer is preferably such that step (i) is carried out at a temperature greater than 100° C., more preferably greater than 120° C.

The impregnated first polymer may be mixed with a second polymer to act as a "masterbatch", and this process may be carried out no matter what temperature the impregnation step has been carried out at. In accordance with a second aspect of the invention, therefore, there is provided a process for introducing a gas into a polymer, comprising the step of:

(i) exposing a first polymer to a gas at a pressure higher than atmospheric pressure to introduce the gas into the polymer; and (ii) forming a mixture of the product of step (i) and a second polymer.

The gas-loaded polymer(s) can then be melted so that the impregnated gas expands the polymer to produce a foamed article. In a preferred embodiment, the polymer is completely melted to form a homogeneous melt, in contrast to some prior art processes which compress and slightly melt the surface of polymer granules in order to bond the granules together.

Preferentially, the polymers are granular precursors of thermoplastics. However, thermosetting materials and thermoplastics in other forms (such as powder) could be envisaged also. The polymers may be crystalline, semi-crystalline or amorphous in nature and may include alloys, blends and compounds thereof. The compounds may include reinforcements, for example glass or carbon fibres, fillers and functional additives, including, but not exclusively, colourants, nanocomposites and flame retardants.

The shaped article produced from the gas saturated precursor may then be utilised for its beneficial properties over the solid material such as, but not exclusively, buoyancy, thermal conductivity, impact performance and lightweight.

The majority of thermoplastic materials and compounds thereof (compounds constituting a very wide range of polymer base material and a functional or reinforcing additive or the like, such as colour or property/attribute modifiers) are available in granular form. Dependent on the nature of the polymer (i.e. amorphous, semi-crystalline or crystalline) these will be processed using conventional, known processes at temperatures where the material is able to flow sufficiently to allow shaping.

In known methods for the production of foamed articles the blowing agent gas is typically introduced under pressure into the melt to form a single phase, molten mixture material and great efforts are taken to restrict premature nucleation of the cellular structure. In the present invention the granular material, either base polymer or compound, is preferentially first exposed to an inert blowing agent gas within a pressure vessel at an elevated pressure. The applied pressure may be any pressure sufficient to dissolve gas into the polymer structure. The time for which the materials are left in this environment is dependent only on the time to achieve the desired level of gas absorption and is minimised by operating at the highest temperature possible given the constraints applied by the requirements which follow. Elevated temperature is beneficial in both reducing time to saturation of the material and also to increase the amount of gas absorbed by the granule, however, it is not a requirement of the process that the material is saturated. It is envisioned that in some instances a controlled level of desorption of gas from the material may be beneficial for post-processing.

For crystalline and semi-crystalline resins it is preferable to process the granules at a temperature above the glass transition temperature ($T_g$) but below the melting point ($T_m$) of the polymer. For amorphous resins the temperature should be below the glass transition temperature ($T_g$) of the polymer. In this way the materials are able to absorb significant quantities of the blowing agent gas into the polymer structure but are unable to flow and fuse together, so retaining the original granule shape and size. The tendency for the materials to leave the pressure vessel handling no differently to when they entered is a key benefit for the next stage of the processing of the materials.

It is well known that gas absorption by polymers is at a minimum close to the $T_g$. By using lower temperatures therefore it is possible to increase absorption of gas by the polymer. However, at these lower temperatures the diffusion rate of gas into the polymer structure is greatly reduced, leading to extensive times for the required level of gas absorption to be achieved.

It is also well known that the key phase change temperatures for polymers (such as $T_g$ and $T_m$) are known to be 'shifted' to higher temperature when increased pressure is applied, and so the possibility exists to carry out the absorption process at temperatures greater than would be expected given the thermal properties of the material as characterised at ambient pressure. However, the potential plasticizing effect of the absorbed gas must also be taken into consideration as this can serve to lower the key phase change temperatures and may cause the granules to fuse together at lower than expected temperatures. There is also the possibility that the gas may nucleate within the granule on release of pressure, however, this is not necessarily disadvantageous to the process.

The materials leaving this stage of the invention, as mentioned, are physically identical to the material prior to exposure to the gas with the exception that if weighed it is obvious that the polymer granules have absorbed significant quantities of the inert blowing agent gas. The nature of the materials (both the polymer and the gas) and the time, temperature and pressure will alone dictate the final gas content of the material. Additionally the nature of the materials and the time, temperature and pressure will also dictate the longevity or rate of loss of gas upon removal from the pressure vessel. Accordingly here it is well known that the rate of desorption of a gas from a polymer may be reduced by maintaining the material at a reduced temperature, for example, by refrigerating the material. Some gas loss is to be expected between removal of the granules from the pressure vessel and post-processing, however, it is desirable that each granule contains a similar amount of gas and thereby provides a consistent feedstock for the post-processing operation.

In post-processing operations, it is advantageous that the materials may be handled as if no intermediate step had been conducted as there is no requirement for further enhancement of the processing equipment or additional hardware, other than that which may be considered prudent in the processing of foams, such as, for example, a shut-off valve on an injection moulding machine. It is important however to process the materials with careful selection of processing parameters and with suitable moulds and sizing equipment as would be obvious to those skilled in the art. This ensures that the optimum structure and desired density reduction is achieved from the gas-laden polymer or polymer compound granules.

In a further aspect of the invention, there is provided a process for the production of foamed, shaped articles comprising the following steps:

a) Exposure of the polymer precursor to an inert gas atmosphere at elevated pressure;

b) Transfer of the gas-laden polymer to standard plastics processing machinery followed by shaping and cooling of the part as known in the art As regards the polymer, the material may be in any form suitable for loading into trays or receptacles in the autoclave, such as powder, granule, pellet or uneven chippings. Ideally the material is in the form to be used in the post-processing operation. In the preferred embodiment the materials are in granular or pellet form.

As regards the inert gases, preferably only inert low boiling gases such as argon, carbon dioxide and nitrogen and combinations of such gases are used as blowing agents. The preferred embodiment uses nitrogen as the blowing agent. The inert gas is allowed to diffuse into the polymer at a specific temperature and pressure to achieve a predefined gas absorption. It is also envisaged that in some instances it may be desirable to allow some desorption of the absorbed gas prior to post-processing in order to achieve greater control in the process.

As regards the uses of the foam, the foams may be produced by any known means for the conversion of plastic granules and powders into shaped articles. Techniques such as injection moulding and extrusion being the most widely employed in the industry. The articles produced therefore can be for a multitude of applications where the use of plastics is currently known or other applications where plastics are not currently utilised as a result of restrictions on properties. Such restrictions may be for example, high thermal conductivity or high specific gravity; these properties may of course be improved by employing the current invention allowing the use of plastic materials with reduced density to displace the incumbent material. In addition to finished articles, semi-finished articles such as continuous profiles in the form of sheets, tubes, rods, etc. may also be envisaged as can the machining, bonding and otherwise post-forming fabrication of the reduced density part such as for the assembly of a reduced density part with other materials by bonding with adhesives or using heat lamination techniques.

It is also envisaged that, as with other foaming techniques, the use of gas laden granules may result in a reduction in shrinkage, warpage and sink marks in the products and may afford the opportunity to reduce cycle times in processes such as injection moulding.

FIG. 1 depicts a scanning electron micrograph of a fracture surface for PEEK150GL30 moulding showing cellular structure.

FIG. 2 also depicts a scanning electron micrograph of a fracture surface for PEEK150GL30 moulding showing cellular structure.

EXAMPLES

Example 1

PEEK 450G (Victrex plc, UK) was taken in standard granular form and exposed to nitrogen atmosphere in a pressure vessel at a pressure of 670 bar and 250° C. for a period of 3 hours. At the end of the cycle the pressure was released and the gas-laden polymer granules were removed.

A small sample of the gas-laden PEEK 450G weighing a few milligrams was then placed into a Thermo-Gravimetric Analyser (TGA) and heated rapidly to 350° C., the equipment was then controlled isothermally for a period to allow the sample mass to stabilise. During isothermal control the mass was seen to decay and on stabilisation the sample was found to have yielded 0.69% mass loss, all of which is attributed here to absorbed nitrogen. A similar sample of PEEK 450G which had not been subjected to the pressure/temperature was then analysed in the same manner and gave a mass loss result of just 0.01%.

It was thus validated that the polymer structure had absorbed between 0.6% and 0.8% gas. On examination under a microscope no signs of the gas could be found. A single pellet of the gas laden polymer was then held on a spatula in a Bunsen flame and on approaching and passing through the melting point of the PEEK polymer nucleation and foaming were clear to see to the naked eye.

Further samples of the gas-laden granules were then transferred to a PVT (PVT=Pressure-Volume-Temperature) machine (SWO/Haake pvt100 at the National Physical Laboratory, Teddington, UK). The chamber was loaded with a few grams of material and mechanical pressure of 65 bar was applied to the sample, via a piston. The material was then heated in the chamber to around 350° C. at a rate of 50° C./min and then held at 350° C. for a further 5 minutes to ensure an even temperature throughout the material. On rapid release of the pressure (by removal of the piston), the sample material in the chamber foamed. After cooling and removal, the sample density of approximately 350 kg/m$^3$ was determined, the equivalent of a volume expansion of 3.5 times.

The same PEEK 450G material was then taken to an injection moulding machine fitted with a simple centre-gated, cylindrical shaped mould.

The injection moulding machine was an Arburg Allrounder at RAPRA Technology, UK. The barrel temperatures comprised a cold feed throat (water cooled) and then running from 330° C. to 420° C. at the nozzle. Die temperatures in the range of 170° C. to 190° C. were used. The machine had a relatively short barrel and would not normally have been recommended for use with this particular material.

Mouldings were produced showing clear skin/core structures, the core of the mouldings being cellular in nature. The overall density reduction was dependent on the specific moulding parameters used but density reductions of the moulded parts were in the range 20% to 50%. The presence of a skin/core structure indicating that the core cellular material must be significantly lower in density than that of the solid skin material surrounding the moulding and also therefore significantly lower than the overall part density.

Finally the PEEK 450G material was fed to a Haake Rheomex 19 mm single screw laboratory extruder fitted with a capillary die (single 3 mm orifice). Extrusion of the material took place using barrel temperatures in the range of 350° C. to 420° C. and a continuous, coarse rod extrudate was produced which was around 9 mm in diameter (expanding as it left the die orifice) and gave a density reduction of 20-25%. No attempt was made in the extrusion process to optimise the parameters or equipment, particularly not the downstream equipment normally employed by those skilled in the art for sizing and control of the profile.

Example 2

Poly Ether Imide (PEI) from GE Plastics (Grade: Ultem 9075) in granular form was exposed to high pressure nitrogen atmosphere at a pressure of 670 bar and 200° C. for a period of 3 hours. The granules were then tested using the same TGA method described in the previous example. The loss of weight (absorbed gas) in this case was found to be of the order of 1.26%.

Example 3

PEEK 150GL30 (Victrex plc, UK) was taken in standard granular form and exposed in a pressure vessel to the same conditions of pressure, temperature and time as in previous examples. This polymer grade contains 30% of glass fibres. At the end of the cycle the pressure was released and the gas-laden polymer granules were removed.

A small sample of the gas-laden compound weighing a few milligrams was then placed into a Thermo-Gravimetric Analyser (TGA) and heated rapidly to 350° C., the sample was then controlled isothermally for a period to allow the sample mass to stabilise. On stabilisation the sample was found to yield 1.26% mass loss, all of which is attributed here to absorbed nitrogen.

Tensile bar mouldings were produced on a BOY injection moulding machine fitted with a 25 mm screw and shut-off nozzle. Barrel temperatures were limited on this machine to 400° C. and it is envisaged that higher temperatures would have significantly improved the level of density reduction possible. Mould temperatures in the range 90° C. to 180° C. were utilised and a wide range of processing parameters evaluated (injection speed, holding pressure and back pressure). Typical density reductions from these trials were of the order of 10% to 20% of the solid density.

The tensile sample bars produced were later tested. The solid material density and tensile properties from manufacturers data sheets were used to characterise the solid material. Table 1 below indicates the level of density reduction and proportionate drop in tensile strength and elongation at break of the foamed products.

On close examination (under SEM) a structure of fracture surfaces of the bars, small bubbles are seen spread evenly through the structure of the bar (FIG. 1 & FIG. 2) and are distinct from the glass fibres and glass 'pull-out' sites that may have formed during fracture. The bubbles forming the cellular structure are produced on moulding due to the precipitation of gas from the molten polymer on entry into the mould cavity (lower pressure environment).

TABLE 1

Density reduction and tensile properties of the PEEK150GL30 mouldings

| Moulding Code | Density [kg/m$^3$] | Reduction in Density [%] | Tensile Strength [MPa] | Elongation at Break [%] |
|---|---|---|---|---|
| Solid* | 1490 | 0 | 178.0 | 2.20 |
| A | 1397 | 6.2 | 129.7 | 1.82 |
| B | 1382 | 7.2 | 123.9 | 1.76 |
| C | 1343 | 9.9 | 116.0 | 1.66 |
| D | 1323 | 11.2 | 107.6 | 1.77 |
| E | 1318 | 11.5 | 110.7 | 1.67 |
| F | 1187 | 20.3 | 89.4 | 1.53 |

*Solid values taken from published data

Example 4

Around 50 kg of each of the following materials were loaded into specially designed containers and loaded into the pressure vessel:

| | |
|---|---|
| Poly Ether Ether Ketone (PEEK) | Grade = PEEK150GL30 [Victrex plc, UK] |
| Polyoxymethylene (POM) | Grade = Hostaform C2521 [Ticona, UK] |
| Polysulphone (PSu) | Grade = Udel P3500 [Solvay, UK] |

The materials were then exposed to a nitrogen atmosphere in the pressure vessel using the conditions of pressure, temperature and time in Table 2 below:

TABLE 2

Conditions for the preparation of gas-laden granules

| Material | Material Type | Pressure (bar) | Temperature (° C.) | Time (hrs) |
|---|---|---|---|---|
| PEEK | Crystalline | 670 | 250 | 3 |
| POM | Semi-Crystalline | 670 | 165 | 3 |
| PSu | Amorphous | 670 | 165 | 3 |

On removal from the pressure vessel samples of each of the granules were taken and weight versus time measurements conducted until no discernible change in weight was seen to occur. The mass loss (gas content) for each of the materials were then determined as 1.21%, 0.60% and 0.41% nitrogen by weight in the PEEK, POM and PSu respectively.

These materials were then held at low temperature (−40° C.) for a period of around three weeks prior to being transported under ambient conditions to Germany for moulding trials. The materials were then further frozen The materials were moulded using a Netstal Synergy S-900-230 injection moulding machine (IKV, Aachen, Germany) and moulding parameters again varied to produce the maximum reduction in density whilst maintaining surface quality to the best possible. The conditions used and density reductions (steps 1 to 7 being based on reduction in shot volume in the moulding operation) for the individual materials are given in Table 3 below:

TABLE 3

Moulding conditions and density reductions achieved for the three gas-laden materials PEEK: PEEK 150GL30
Barrel Zone/Mould Temperatures

| Zone 1 (Feed Port) | Zone 2 | Zone 3 | Zone 4 | Zone 5 | Zone 6 (Nozzle) | Mould |
|---|---|---|---|---|---|---|
| 90° C. | 270° C. | 340° C. | 360° C. | 380° C. | 380° C. | 150° C. |

| Moulding Step | Injection Speed (cm3/sec) | Holding Pressure | Moulding Weight (g) | Weight Reduction (%) |
|---|---|---|---|---|
| Solid | 24 | Yes | 84.20 | — |
| 1 | 24 | No | 79.94 | 5.06 |
| 2 | 24 | No | 75.41 | 10.45 |

TABLE 3-continued

Moulding conditions and density reductions achieved for the three gas-laden materials

| | | | | |
|---|---|---|---|---|
| 3 | 24 | No | 71.38 | 15.22 |
| 4 | 24 | No | 67.06 | 20.36 |
| 5 | 24 | No | 58.54 | 30.47 |
| 6 | 24 | No | 54.66 | 35.10 |
| 7 | 24 | No | 53.64 | 36.30 |

POM: Hostaform C2521
Barrel Zone/Mould Temperatures

| Zone 1 (Feed Port) | Zone 2 | Zone 3 | Zone 4 | Zone 5 | Zone 6 (Nozzle) | Mould |
|---|---|---|---|---|---|---|
| 60° C. | 150° C. | 200° C. | 210° C. | 220° C. | 230° C. | 90° C. |

| Moulding Step | Injection Speed (cm3/sec) | Holding Pressure | Moulding Weight (g) | Weight Reduction (%) |
|---|---|---|---|---|
| Solid | 40 | Yes | 72.15 | — |
| 1 | 40 | No | 69.72 | 3.37 |
| 2 | 40 | No | 65.10 | 9.78 |
| 3 | 40 | No | 57.82 | 19.85 |
| 4 | 40 | No | 50.38 | 30.17 |
| 5 | 40 | No | 43.12 | 40.23 |

PSu: Udel P3500
Barrel Zone/Mould Temperatures

| Zone 1 (Feed Port) | Zone 2 | Zone 3 | Zone 4 | Zone 5 | Zone 6 (Nozzle) | Mould |
|---|---|---|---|---|---|---|
| 90° C. | 290° C. | 320° C. | 340° C. | 360° C. | 380° C. | 150° C. |

| Moulding Step | Injection Speed (cm3/sec) | Holding Pressure | Moulding Weight (g) | Weight Reduction (%) |
|---|---|---|---|---|
| Solid | 40 | Yes | 68.17 | — |
| 1 | 40 | No | 63.35 | 7.07 |
| 2 | 40 | No | 57.58 | 15.53 |
| 3 | 40 | No | 49.62 | 27.21 |
| 4 | 40 | No | 43.50 | 36.18 |
| 5 | 40 | No | 40.50 | 40.58 |

The invention claimed is:

1. A process for producing a foamed article, comprising the steps of:
   (i) exposing a first polymer to a gas at a temperature ranging from the glass transition temperature ($T_g$) to below the melting temperature ($T_m$) of the first polymer and at a pressure higher than atmospheric pressure to introduce the gas into the polymer, wherein the first polymer is in a form selected from the group consisting of powder, granules, pellets, particles, and chippings, and wherein the exposing yields a gas-laden product in the form, and
   (ii) forming a mixture of the product of step (i) and a second polymer, and then
   (iii) completely melting the product of step (ii) to form a homogeneous melt, and then
   (iv) producing a foamed article.

2. A process as claimed in claim 1, wherein the first polymer is crystalline or semi-crystalline in nature.

3. A process as claimed in claim 1, wherein the pressure in step (i) is from 5 to 1000 bar ($5 \times 10^5$ to $1 \times 10^8$ Pa).

4. A process as claimed in claim 3, wherein the pressure is from 35 to 700 bar ($3.5 \times 10^6$ to $7 \times 10^7$ Pa).

5. A process as claimed in any one of claims 1, 2, 3 and 4, wherein step (i) is carried out at a temperature greater than 100° C.

6. A process as claimed in any one of claims 1, 2, 3, and 4, wherein the second polymer is the same substance as the first polymer.

7. A process as claimed in any one of claims 1, 2, 3 and 4, wherein the form of the second polymer is the same as the form of the first polymer.

8. A process as claimed in any one of claims 1, 2, 3, and 4, wherein the foamed article has a void fraction from 2% to 70%.

9. A process as claimed in any one of claims 1, 2, 3, and 4, wherein step (iii) comprises the step of injection moulding, extruding, extrusion-blow moulding, transfer moulding, compression moulding, rotational moulding, injection-expansion moulding, or any combination thereof.

10. A product produced according to the process recited in claim 1.

11. A process for producing a foamed article, comprising the steps of:
   (i) exposing a first polymer to a gas at a temperature below the melting temperature ($T_m$) of the first polymer and at a pressure higher than atmospheric pressure to introduce the gas into the polymer, wherein the first polymer is selected from the group consisting of poly ether ether ketone, poly ether imide, polyoxymethylene, and polysulphone, wherein the first polymer is in a form selected from the group consisting of powder, granules, pellets, particles, and chippings, and wherein the exposing yields a gas-laden product in the form, and (ii) forming a mixture of the product of step (i) and a second polymer, and then (iii) melting the product of step (ii) to form a homogeneous melt, and then (iv) producing a foamed article.

12. A process for producing a foamed article, comprising the steps of:

(i) exposing a first polymer to a gas at a temperature below the melting temperature ($T_m$) of the first polymer and at a pressure higher than atmospheric pressure to introduce the gas into the polymer, wherein the temperature is greater than 120° C., wherein the first polymer is in a form selected from the group consisting of powder, granules, pellets, particles, and chippings, and wherein the exposing yields a gas-laden product in the form, and (ii) forming a mixture of the product of step (i) and a second polymer, and then (iii) completely melting the product of step (ii) to form a homogeneous melt, and then (iv) producing a foamed article.

* * * * *